Aug. 11, 1931. L. D. McILVIN 1,818,859

AUTOMATIC ARC WELDING MACHINE

Filed Sept. 28, 1927

Inventor:
Leon D. McIlvin,
by
His Attorney.

Patented Aug. 11, 1931

1,818,859

UNITED STATES PATENT OFFICE

LEON D. McILVIN, OF LYNN, MASSACHUSETTS, ASSIGNOR TO GENERAL ELECTRIC COMPANY, A CORPORATION OF NEW YORK

AUTOMATIC ARC WELDING MACHINE

Application filed September 28, 1927. Serial No. 222,632.

My invention relates to improvements in fusion welding, and more particularly to automatic arc welding machines wherein means are provided for automatically guiding the arcing terminal of an electrode along the seam to be welded.

In a machine according to my invention the work parts are traversed by a source of heat, such as an arc or a gas flame, which is caused to follow the seam between the parts, no matter how irregular or meandering the same may be, by reason of an improved guiding device forming a part of the machine.

My invention and the objects thereof will be better understood from the following description taken in connection with the accompanying drawings and its scope will be pointed out in the appended claims.

Figure 1:
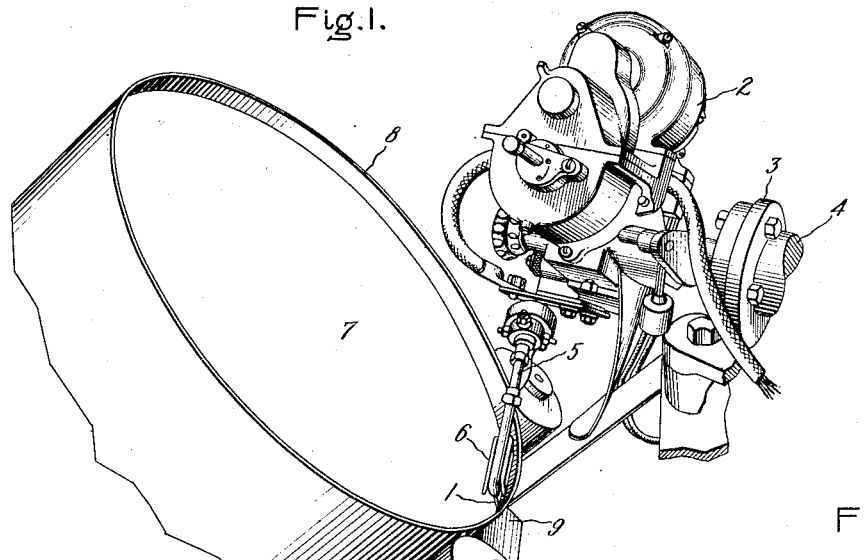
Figure 2:
Figure 3:
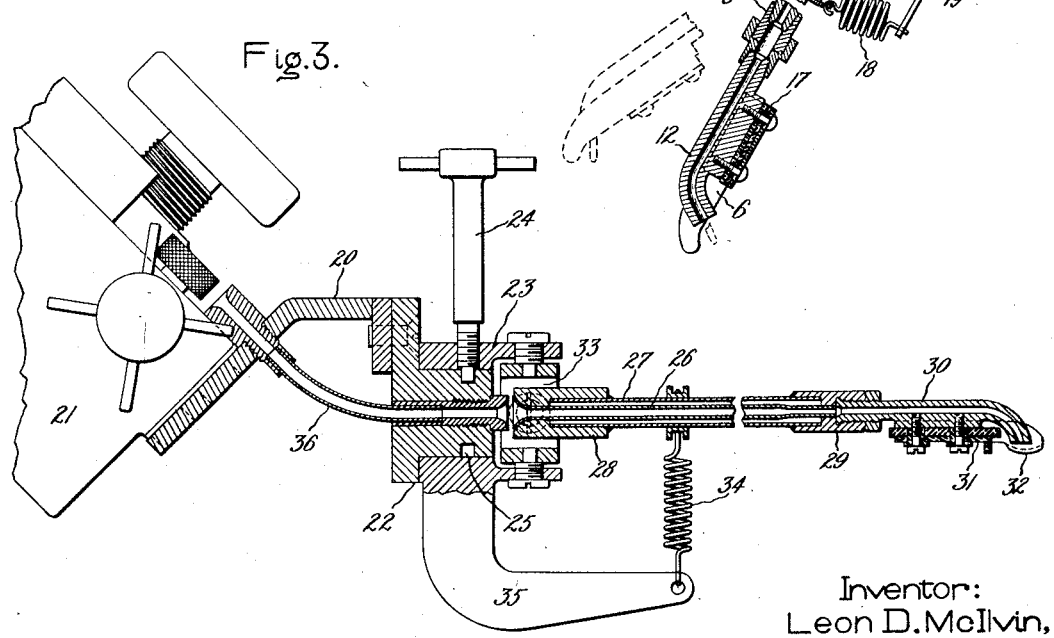

In the drawings Fig. 1 is a perspective view of a portion of an automatic arc welding machine embodying my invention and Fig. 2 is a detail showing my improved guiding device. Fig. 3 shows a modified arrangement which is adapted for use in welding machines employed in performing welding operations where there is little clearance between the parts being welded and adjacent parts of the same structure or different structures.

The machine illustrated in Fig. 1 is an automatic arc welding machine adapted to perform a welding operation according to the metallic arc process. In this machine the electrode 1 is fed towards the work by a welding head comprising electrode feeding mechanism 2 supported at 3 on a portion 4 of the frame of the welding machine. The electrode 1 is drawn from a reel, not shown, and fed to the work through a self-guiding device generally indicated at 5. This device terminates in a guiding member 6 whch may assume many forms but as illustrated comprises two fingers that straddle the free end of the guiding device 5 and are adapted to engage the work along the seam to be welded. As shown in Fig. 1 it rides in the groove formed between the end or bottom 7 and the wall 8 of a tank constituting the work piece. The tank as a whole is supported in the machine on an inclined tank roller 9, only a portion of which is shown in the drawings. This roller turns the tank slowly about its axis during the welding operation while the guiding member 6 of the guiding device 5 follows the groove between the bottom 7 and the wall 8 of the tank guiding the arcing terminal of the electrode along the seam to be welded. The details of the tank roller 9 and of the welding head 2, which in the present instance is adapted to maintain the arc length constant by varying the rate of feed in response to a characteristic of the arc, have not been illustrated and will not be described since such devises are well known to those skilled in the art to which the present invention applies.

As shown in Fig. 2 the guiding device 5 comprises a supporting member 10 adapted for attachment to a welding head as shown in Fig. 1, on which is suspended a conduit 11 terminating in a nozzle 12 and the guiding member 6. The conduit 11 is flexibly attached to the support 10 by means of a universal joint 13 and ring and boss members 14 and 15 so that the conduit may have freedom of angular movement in every direction about a pivot point located at the universal joint while at the same time the conduit 11 may be rotated relatively to the support 10 so that the direction in which the nozzle 12 and the guiding member 6 point may be changed relative to the support 10. This rotational adjustment is made by loosening a set screw 16, turning the ring member 14 about the boss 15 until the desired position is obtained, and then tightening the set screw 16 to hold the parts in their adjusted relationship. A groove in member 15 in which the set-screw 16 is adapted to ride prevents the separation of parts 14 and 15 during this adjustment.

As shown in the drawings, the guiding member 6 is insulated from the nozzle 12 at 17 to prevent the guiding member 6, which in the machine illustrated is made of metal, from short circuiting the arc maintained between the work and the terminal of the electrode fed through the nozzle 12. In practice it has been found desirable to make the guiding member 6 and the nozzle 12 of copper to which the electrode metal will not readily adhere. It is, of course, possible to make the guiding member 6 of an insulating material instead of a metal in which case the material of the guiding member will of itself form an insulating medium between the nozzle 12 and the work. The guiding member is forced into engagement with the work by means of a spring 18 which may be attached as illustrated to the conduit 11 and to a bracket 19 which in turn is attached to the ring member 14.

In performing the welding operation of securing a tank bottom into a tank, indicated in Fig. 1, the tank is inserted into the machine where it is supported on the tank roller 9. The guiding device 5 is then placed upon the work with the guiding member 6 resting in the groove or channel formed between the parts 7 and 8 of the tank as shown in Fig. 1. The tip of the nozzle 12 should be lined up with the spring 18 and locked in that position by means of the set screw 16 previous to the welding operation. The relative positions of the end of the guiding device during welding are shown by dotted lines in Fig. 2. It will be noted that the curved nozzle directs the electrode normally to the seam in much the same manner as if the electrode were fed directly to the seam. After the welding operation has been started the guiding member 6 will cause the arc maintained at the terminal of the electrode by the automatic feeding means to traverse the seam independently of variations in the alignment of the parts so that no further attention is necessary until the machine has completed the welding of the seam.

In Fig. 3 I have illustrated a slightly modified arrangement for use in welding where there is little headroom. In this case the arrangement is such that the movable portion of the device extends in a horizontal direction from the fixed portion of the device. The fixed portion comprises a supporting bracket 20 which is illustrated as attached to a welding head part of which is shown at 21. This bracket is provided with a boss 22 upon which is supported a yoke 23 held in place on the boss by a set screw 24 which engages a groove 25 in the boss. The set screw also serves to clamp the yoke 23 in any desired position relative to the bracket 20.

The movable portion of the device comprises a plurality of concentric tubes 26 and 27 terminating in tips 28 and 29 to the latter of which is attached nozzle 30. Two tubes are in this case used to secure a certain amount of heat insulation. The outer tube may be coated with an insulating medium such as vitrified enamel to prevent short-circuiting the arc during the welding operation which might otherwise occur when the tube came in contact with the work. Attached to the nozzle is a guiding member 31 having two fingers 32 between which the tip of the nozzle is located. By varying the bend of this tip, which is made of copper and therefore easily bent, a position can be found where magnetic blowing is eliminated due to counter magnetic fields in the curved portion of the nozzle.

The movable portion of the device is attached to the fixed portion by a universal joint 33 and is biased in a given direction by a spring 34 attached to the tube 27 and to an arm 35 forming a portion of the yoke member 23. Although a single arm and spring is illustrated under certain conditions it may prove desirable to use a plurality of arms and springs. The electrode is conducted from the welding head 21 through a curved tube 36 located in bracket 20, tube 26, and nozzle 30 to the work.

While I have illustrated my invention in connection with automatic arc welding machines in order to describe preferred embodiments of the invention, it will be apparent to those skilled in the art that it is of general utility in welding machines of every character where a source of heat is traversed along a seam to be welded and/or a metallic rod is fused and incorporated in the weld. It is also apparent that certain modifications and changes may be made without departing from my invention and I, therefore, intend to cover by the appended claims all such changes and modifications as fall within the scope of my invention.

What I claim as new and desire to secure by Letters Patent of the United States is:

1. A machine for welding wherein a metallic rod is fused and incorporated in the work comprising means for feeding said rod toward the work, a conduit for conducting said rod to the work, means for flexibly attaching one end of said conduit in the machine in registry with said feeding means, means engaging the work at the point of welding for guiding the discharge end of said conduit along the work, and means for biasing said guiding means into engagement with the work.

2. A welding machine wherein a metallic rod is fused and incorporated in the work, comprising means for feeding said rod toward the work, means for conducting said rod from said feeding means to the work and for guiding the terminal of said rod along the seam to be welded comprising a member one end of which is supported by a universal joint in the machine in proximity to said feeding means and the other end of which is provided near its free end with a guiding member adapted to follow along the seam, and means for forcing said guiding member into engagement with the work.

3. A welding device, comprising a supporting member, a conduit, means providing rotational adjustment between said supporting member and said conduit, a universal joint for connecting one end of said conduit to said adjusting means, a nozzle member attached to the other end of said conduit, guide means adapted to follow along a seam to be welded attached to said nozzle, and means for biasing said guide means in a predetermined direction.

4. An arc welding machine comprising means responsive to a characteristic of the arc for feeding an electrode toward the work and means for conducting said electrode from said feeding means and for guiding its arcing terminal along the seam to be welded comprising a member supported in said machine at its fixed end by a universal joint and having at its free end a work engaging guiding member.

5. An electric arc welding machine comprising electrode feeding means adapted to feed an electrode to the work, means for conducting said electrode from said feeding means to the work, said means being supported in the welding machine by means of a universal joint, and guide means adapted to follow along the seam to be welded and to direct the arc along said seam attached to said first mentioned means near the arcing terminal of the electrode.

6. A tank welding machine comprising an inclined roller mechanism adapted to support and rotate the tank being welded, and means for directing a source of heat along the seam formed between the end of said tank and its projecting side wall comprising a member pivotally supported in the machine and having at its free end near the source of heat a guide member adapted to follow along said seam.

In witness whereof, I have hereunto set my hand this 23rd day of September, 1927.

LEON D. McILVIN.